US011704635B2

(12) United States Patent
Seitz et al.

(10) Patent No.: US 11,704,635 B2
(45) Date of Patent: Jul. 18, 2023

(54) VIRTUAL CURRENCY FOR MANAGING ADVERTISING AND CONTENT DELIVERY

(71) Applicant: T-Mobile USA, Inc., Bellevue, WA (US)

(72) Inventors: Nicholas Seitz, Seattle, WA (US); Christopher Spanton, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 392 days.

(21) Appl. No.: 16/141,796

(22) Filed: Sep. 25, 2018

(65) Prior Publication Data

US 2020/0097994 A1 Mar. 26, 2020

(51) Int. Cl.
| | |
|---|---|
| *G06Q 30/0226* | (2023.01) |
| *G06Q 20/36* | (2012.01) |
| *G06Q 20/06* | (2012.01) |
| *G06Q 30/08* | (2012.01) |
| *G06Q 30/0251* | (2023.01) |

(Continued)

(52) U.S. Cl.
CPC ........... *G06Q 20/065* (2013.01); *G06Q 20/12* (2013.01); *G06Q 20/3678* (2013.01); *G06Q 30/0231* (2013.01); *G06Q 20/123* (2013.01); *G06Q 30/0264* (2013.01); *G06Q 30/0275* (2013.01);

(Continued)

(58) Field of Classification Search
CPC ................................................ G06Q 30/0231
See application file for complete search history.

(56) References Cited

U.S. PATENT DOCUMENTS

| | | | | |
|---|---|---|---|---|
| 5,892,900 A | * | 4/1999 | Ginter | G06F 21/10 |
| | | | | 726/26 |
| 8,473,976 B2 | * | 6/2013 | Udani | G06Q 30/02 |
| | | | | 725/23 |

(Continued)

FOREIGN PATENT DOCUMENTS

| | | | | | |
|---|---|---|---|---|---|
| CN | 105389710 A | * | 3/2016 | ......... | G06Q 30/0231 |
| CN | 108335134 A | * | 7/2018 | ......... | G06Q 30/0275 |
| WO | WO-2016118383 A1 | * | 7/2016 | ......... | G06Q 30/0256 |

OTHER PUBLICATIONS

R. De Michele and M. Furini, "TV commercials: Improving viewers engagement through gamification and second screen," 2017 IEEE Symposium on Computers and Communications (ISCC), 2017, pp. 128-133, doi: 10.1109/ISCC.2017.8024517. (Year: 2017).*

(Continued)

*Primary Examiner* — Jacob C. Coppola
*Assistant Examiner* — Eduardo Castilho
(74) *Attorney, Agent, or Firm* — Han Santos, PLLC

(57) ABSTRACT

A content delivery platform may deliver program content segments and advertising content segments to multiple user devices. The content delivery platform may deliver a program content segment to a primary user device of a user for presentation on the primary user device. The content delivery platform may retrieve an advertising content segment from an advertising content store for presentation. The advertising content segment is provided by an advertiser that is sponsoring the presentation of the program content segment on the primary user device. The content delivery platform may send the advertising content segment to a secondary user device of the user for presentation at the secondary user device.

20 Claims, 8 Drawing Sheets

(51) Int. Cl.
  *G06Q 30/0273* (2023.01)
  *G06Q 20/12* (2012.01)
(52) U.S. Cl.
  CPC ......... *G06Q 30/08* (2013.01); *G06Q 2220/00* (2013.01)

(56) References Cited

U.S. PATENT DOCUMENTS

| | | | | |
|---|---|---|---|---|
| 8,671,423 | B1* | 3/2014 | Chang | H04N 21/4755 |
| | | | | 725/32 |
| 8,966,521 | B2* | 2/2015 | Soundararajan | G06Q 30/00 |
| | | | | 725/78 |
| 9,201,627 | B2* | 12/2015 | Tam | G06F 3/1454 |
| 10,019,711 | B1* | 7/2018 | Lerner | G06Q 20/40 |
| 10,546,326 | B2* | 1/2020 | Publicover | G06Q 30/0269 |
| 10,827,221 | B2* | 11/2020 | Petander | G06F 16/74 |
| 10,834,467 | B2* | 11/2020 | Truong | H04N 21/4784 |
| 10,885,523 | B1* | 1/2021 | Luttrell | G06Q 20/3674 |
| 2002/0097979 | A1* | 7/2002 | Lowthert | H04N 21/6581 |
| | | | | 348/E7.063 |
| 2003/0031455 | A1* | 2/2003 | Sagar | G06Q 30/0247 |
| | | | | 386/E5.043 |
| 2003/0149621 | A1* | 8/2003 | Shteyn | G06Q 30/0272 |
| | | | | 705/1.1 |
| 2004/0133909 | A1* | 7/2004 | Ma | G06Q 30/0264 |
| | | | | 348/E7.071 |
| 2006/0282389 | A1* | 12/2006 | Gupte | G06Q 30/02 |
| | | | | 705/52 |
| 2008/0300985 | A1* | 12/2008 | Shamp | G06Q 30/0267 |
| | | | | 455/41.3 |
| 2010/0280641 | A1* | 11/2010 | Harkness | G10L 19/018 |
| | | | | 700/94 |
| 2011/0016492 | A1* | 1/2011 | Morita | H04N 21/4882 |
| | | | | 725/58 |
| 2011/0069940 | A1* | 3/2011 | Shimy | H04N 21/42201 |
| | | | | 386/296 |
| 2011/0162002 | A1* | 6/2011 | Jones | G06Q 30/0241 |
| | | | | 725/32 |
| 2013/0198013 | A1* | 8/2013 | Shehan | G06Q 30/02 |
| | | | | 705/14.73 |
| 2013/0276010 | A1* | 10/2013 | Drayson | G06Q 30/0275 |
| | | | | 725/32 |
| 2014/0108252 | A1* | 4/2014 | Itwaru | G06Q 20/3276 |
| | | | | 705/44 |
| 2014/0337872 | A1* | 11/2014 | Hou | H04N 21/4394 |
| | | | | 725/18 |
| 2014/0358697 | A1* | 12/2014 | Irwin | G06Q 30/0275 |
| | | | | 705/14.71 |
| 2015/0287032 | A1* | 10/2015 | Friedman | G06Q 20/40 |
| | | | | 705/44 |
| 2015/0317666 | A1* | 11/2015 | Pygnasak | G06Q 30/0226 |
| | | | | 705/14.27 |
| 2016/0189212 | A1* | 6/2016 | Rao | G06Q 30/0249 |
| | | | | 705/14.48 |
| 2016/0191972 | A1* | 6/2016 | Rao | G06Q 30/08 |
| | | | | 725/34 |
| 2017/0013316 | A1* | 1/2017 | Zhang | H04N 21/812 |
| 2017/0026701 | A1* | 1/2017 | Shaw | H04N 21/2668 |
| 2017/0034592 | A1* | 2/2017 | Ray | G06Q 30/0275 |
| 2017/0104831 | A1* | 4/2017 | Fransen | H04L 43/16 |
| 2017/0214980 | A1* | 7/2017 | Nadler | H04N 21/2543 |
| 2018/0084308 | A1* | 3/2018 | Lopatecki | G06Q 30/0255 |
| 2018/0124438 | A1* | 5/2018 | Barnett | G06Q 30/02 |
| 2018/0288022 | A1* | 10/2018 | Madisetti | G06Q 20/3829 |
| 2018/0343484 | A1* | 11/2018 | Loheide | G06Q 30/0251 |
| 2019/0164209 | A1* | 5/2019 | Park | G06Q 30/0639 |
| 2019/0205943 | A1* | 7/2019 | Candelore | G06Q 30/0273 |
| 2019/0318348 | A1* | 10/2019 | Brenner | G06Q 20/389 |
| 2019/0327218 | A1* | 10/2019 | Altenhofen | G06Q 20/065 |
| 2019/0333096 | A1* | 10/2019 | Johnson | G06Q 30/0248 |
| 2020/0084483 | A1* | 3/2020 | Brown | G06Q 30/0246 |
| 2020/0090143 | A1* | 3/2020 | Iervolino | G06Q 20/1235 |

OTHER PUBLICATIONS

"Javier Parra-Arnau, Jagdish Prasad Achara, Claude Castelluccia MyAdChoices: Bringing Transparency and Control to Online Advertising arXiv: 1602.02046 [cs.CY] https://doi.org/10.48550/arXiv.1602.02046" (Year: 2016).*

F. Vega, J. Medina, V. Saquicela, K. Palacio-Baus and M. Espinoza, "Towards a multi-screen interactive ad delivery platform," 2017 XLIII Latin American Computer Conference (CLEI), 2017, pp. 1-10, doi: 10.1109/CLEI.2017.8226400. (Year: 2017).*

M. Pärssinen, M. Kotila, R. Cuevas Rumin, A. Phansalkar and J. Manner, "Is Blockchain Ready to Revolutionize Online Advertising ?," in IEEE Access, vol. 6, pp. 54884-54899, 2018, doi: 10.1109/ACCESS.2018.2872694. (Year: 2018).*

Anonymous, "System, method and computer program product for presenting an option to receive advertisement content," IP.com disclosure, 2006, https://ip.com/IPCOM/000143573. (Year: 2006).*

M. Iwashita and S. Tanimoto, "Consideration of Highly Secure Transaction System in E-Commerce," 2015 3rd International Conference on Applied Computing and Information Technology/2nd International Conference on Computational Science and Intelligence, 2015, pp. 432-437, doi: 10.1109/ACIT-CSI.2015.81. (Year: 2015).*

S. Alghamdi and N. Beloff, "Virtual currency concept: Its implementation, impacts and legislation," 2015 Science and Information Conference (SAI), 2015, pp. 175-183, doi: 10.1109/SAI.2015.7237142. (Year: 2015).*

R. Seeliger, D. Silhavy, S. Pham and S. Arbanowski, "Cross-platform ad-insertion using HbbTV and MPEG-DASH," 2016 Asia Pacific Conference on Multimedia and Broadcasting (APMediaCast), 2016, pp. 7-13, doi: 10.1109/APMediaCast.2016.7878174. (Year: 2016).*

* cited by examiner

VIRTUAL CURRENCY FOR MANAGING ADVERTISING AND CONTENT DELIVERY

BACKGROUND

Media streaming services are become ever more popular with consumers. Consumers may watch streamed program content on non-portable large screen user devices such as smart television sets and desktop computers. Consumers may also watch streamed program content on portable user devices, such as smart phones, laptop computers, and tablet computers. The streamed program content may include live content that is delivered in real-time by content providers, as well as pre-produced media content that may be streamed on-demand from content providers upon requests by consumers. In some instances, consumers may pay a recurring subscription fee for the streaming of program content from a content provider. In other instances, the streaming of program content to consumers may be supported or subsidized by advertising revenue from advertisers. In such instances, the delivery of program content to user devices is combined with the delivery of advertising content, such that users are compelled to view the advertising content in order to view the program content.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
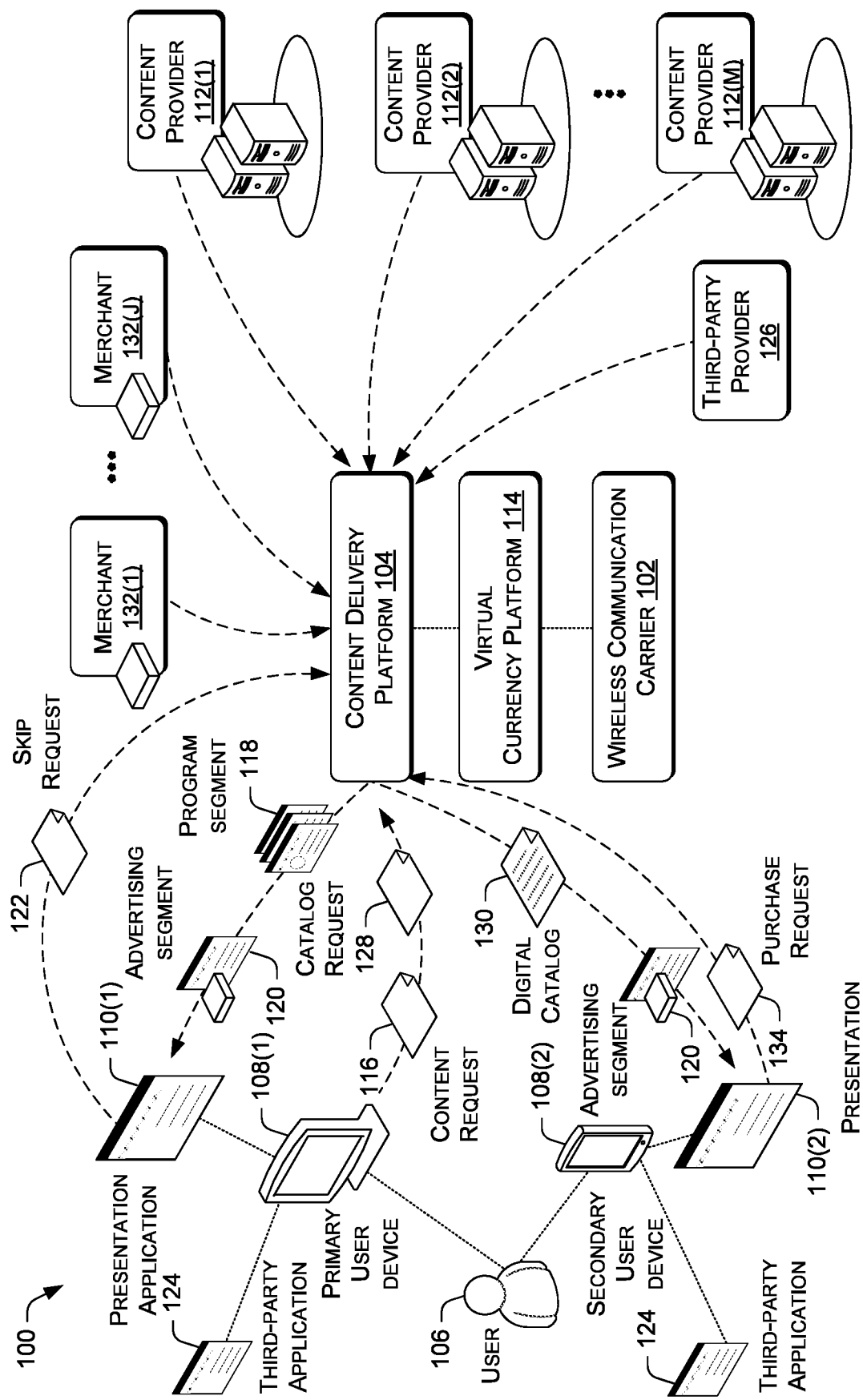
FIG. 1 illustrates an example architecture of a content delivery platform that provides for the delivery of content to multiple user devices and the use of virtual currency to manage advertising and content delivery.

This disclosure is directed to techniques that enable a wireless communication carrier to use a content delivery platform that aggregates program content segments from multiple content providers to deliver content to user devices of users. The user devices may include non-portable large screen user devices such as smart television sets, smart video projectors, desktop computers, etc., as well as portable user devices such as smart phones, smart watches, laptop computers, tablet computers, vehicle infotainment consoles, etc. Generally speaking, a non-portable large screen user device may have a larger display screen than the portable user device. The content delivery platform may provide sponsored program content segments to users, in which the cost of delivering the sponsored program content segments to the user devices of the users is fully or partially paid by advertisers. Accordingly, the content delivery platform may enable a user to consume program content segments on a primary user device in exchange for consuming advertising content segments from the advertisers on a primary user device or a secondary user device. The consumption of a content segment may include viewing the segment, listening to the segment, interacting with the segment, and/or otherwise experiencing the segment in some manner. The consumption of the advertising content segments on the secondary user device may be deferred by the user to a later time.

In additional instances, the content delivery platform may enable the user to use virtual currency to pay for the privilege of skipping the consumption of the advertising content segments. In other instances, the content delivery platform may enable the user to purchase products or services that are related to a program content segment being presented on a user device. In such instances, the wireless communication carrier may award virtual currency credits to the user in exchange for using the telecommunication services provided by the carrier or completing certain tasks as designated by the carrier. Furthermore, the content delivery platform may provide a gamification function that enables users to earn achievement awards with respect to the consumption of program content segments or advertising content segments.

The techniques may enable a wireless communication carrier to provide media streaming services to telecommunication service users by aggregating program content segments from multiple content providers for delivery to the users. By providing users with the ability to defer the consumption of advertising content segments to a later time or using awarded virtual currency to skip the consumption of advertising content segments, the wireless communication carrier may increase user satisfaction and provide additional incentives for the users to utilize the telecommunication services offered by the wireless communication carrier. The techniques described herein may be implemented in a number of ways. Example implementations are provided below with reference to the following figures.

Example Architecture

FIG. 1 illustrates an example architecture 100 of a content delivery platform that provides for the delivery of content to multiple user devices and the use of virtual currency to manage advertising and content delivery. The architecture 100 may include a wireless communication carrier 102 that controls a content delivery platform 104. The wireless communication carrier 102 may operate a wireless carrier network. The wireless carrier network may provide a wide range of mobile communication services, as well as ancillary services and features, to subscribers and associated mobile device users. The wireless carrier network may be implemented using multiple interconnected networks. In various embodiments, the wireless carrier network may include multiple Radio Access Networks (RANs). The RANs may be connected to each other via regional ground networks. In turn, the regional ground networks may be connected to a core network by a wide area network (WAN). Each regional portion of the wireless carrier network may include one or more RANs and a regional circuit and/or packet switched network and associated signaling network facilities. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth. In some embodiments, the core network of the wireless carrier network may be accessed via wired or wireless local area networks (LANs). For example, a wireless local area network may be a network that is established using Wi-Fi or Bluetooth standards and hardware.

In various embodiments, the wireless carrier network may provide telecommunication services to user devices of a user 106. The user devices of the user 106 may include a primary user device 108(1) and a secondary user device 108(2). Each of the primary user device or the secondary user device may be a non-portable large screen user device, such as a smart television set, a smart video projector, a desktop computer, or a similar non-portable user device. Alternatively, each of the primary user device or the secondary user device may be a portable user device, such as a smartphone, a smartwatch, a laptop computer, a tablet computer, a vehicle infotainment console, or a similar portable device. However, in the implementations illustrated in the figures, each of the primary user device 108(1) and the secondary user device 108(2) is of a different type. For example, when the primary user device 108(1) is a non-portable large screen user device, the secondary user device 108(2) is a portable user device. Conversely, when the primary user device 108(1) is a portable user device, the secondary user device 108(2) is a non-portable large screen user device. However, in some instances, the concepts described herein may also apply to cases where the primary user device 108(1) and the secondary user device 108(2) are of the same type as one another. Each of the primary user device 108(1) and the secondary user device 108(2) is equipped with a presentation application that is configured to present streamed media content, such as program content segments and advertising content segments. For example, the primary user device 108(1) may be equipped with a presentation application 110(1), and the secondary user device 108(2) may be equipped with a presentation application 110(2). In various embodiments, the presentation applications 110(1) and 110(2) may be provided by the wireless communication carrier 102 or by the content delivery platform 104 on behalf of the wireless communication carrier 102.

The content delivery platform 104 may aggregate content from content providers 112(1)-112(M) for delivery to the user devices of users, such as the user devices 108(1) and 108(2) of the user 106. In some embodiments, the content delivery platform 104 may be operated by the wireless communication carrier 102 or by a third-party for the wireless communication carrier 102. The content providers 112(1)-112(M) may include program content providers and advertising content providers. The program content segments that are provided by the program content providers may include live content that is delivered in real-time, as well as pre-produced media content that may be streamed on-demand. The program content providers may generate revenue by selling broadcast or streaming rights for the program content segments. Accordingly, the wireless communication carrier 102 may pay the program providers for the broadcast or streaming rights for the program content segments. The advertising content segments are provided by advertisers who desire to promote products or services to consumers through advertisements. The wireless communication carrier 102 may receive payments from the advertisers for presenting the advertising content segments to users. In some instances, the wireless communication carrier 102 may use the revenue received from advertisers to purchase broadcast or streaming rights from the program content providers. In turn, the wireless communication carrier 102 may use the content delivery platform 104 to deliver the program content segments and the advertising content segments for presentation to users. In this way, the advertisers may sponsor the presentation of program content segments on the user devices by having their advertising content segments presented along with the program content segments on the user devices. The content delivery platform 104 may receive the program content segments or the advertising content segments via a communication link provided by the wireless carrier network, or a communication link that is provided by an alternative network in the form of a local area network (LAN), a larger network such as a wide area network (WAN), or a collection of networks, such as the Internet.

In turn, the content delivery platform 104 may deliver program content segments and advertising content segments to the users, such as the user 106, via similar networks. The content delivery platform 104 may deliver a specific program content segment 118 (e.g., a show, an episode, a media work, a broadcast event, etc.) to the primary user device 108(1) of the user 106 so that the presentation application 110(1) on the primary user device 108(1) may present the specific program content segment. Additionally, the content delivery platform 104 may deliver one or more advertising content segments (e.g., advertising content segment 120) to the presentation application 110(1) on the primary user device 108(1) for presentation in conjunction with the delivery of the specific program content segment 118. The advertising content segments may include one or more advertisements that promote products and services. In various embodiments, the delivery of the advertising content segments may occur preceding the delivery of the specific program content segment 118, may occur in parallel with the delivery of the specific program content segment 118, may be interspersed with the delivery of the specific program content segment 118, and/or may occur following the delivery of the specific program content segment 118. Accordingly, the advertising content segments may be presented by the presentation application prior to the presentation of the specific program content segment 118, during or interspersed with the presentation of the specific program content segment 118, or after the presentation of the specific program content segment 118. However, in some instances, the content delivery platform 104 may be triggered by the user to deliver the advertising content segments to the secondary user device 108(2) of the user 106 for presentation at a different time, rather than being presented in real-time at the primary user device 108(1).

The architecture 100 may further include a virtual currency platform 114 that enables the wireless communication carrier 102 to issue virtual currency credits to the subscribers of the carrier, such as the user 106. The virtual currency is a digital representation of value that is not issued by a governmental body. Instead, the virtual currency is issued by a private entity for use in conducting private electronic payment transactions. In some embodiments, the virtual currency may be in the form of cryptocurrency for which transactions are secured via blockchain technology. Blockchain refers to the use of a blockchain, or a continuously growing list of linked records, i.e., blocks, to store data. The linked account records in the blockchain may be secured using cryptography such that each block contains a hash pointer that links the block to a previous block. Each block is configured to store a record and associated metadata, such as a timestamp, an identifier of the record, a type of the record, and/or so forth. Further, each block in the blockchain may be stored and managed by peer-to-peer network computing nodes that use a block validation protocol. This means that it is not possible to retroactively alter the record stored in any particular block of the blockchain without altering all subsequent blocks with the cooperation of a majority of the network peers in the peer-to-peer network. Accordingly, blockchain technology provides a decentralized secure data storage for storing records of the virtual currency platform 114 in a verifiable and permanent manner.

In some instances, the virtual currency platform 114 may enable a user to pay virtual currency credit to the content delivery platform 104 for the privilege of skipping the consumption of a particular advertising content segment on a primary user device or a secondary user device, while retaining the privilege of consuming the associated specific program content segment on the primary user device. Accordingly, upon receiving such a virtual credit payment, the content delivery platform 104 may direct the presentation application on the primary user device or the secondary user device to forego the presentation of the particular advertising content segment that is associated with the specific program content segment. In other instances, the virtual currency platform 114 may also enable users to purchase products or services using the virtual currency. In such instances, a merchant that is offering a product or service for sale may be set up to accept conventional government-backed money rather than the virtual currency. Accordingly, the virtual currency platform 114 may provide an exchange mechanism for converting the virtual currency into other assets, such as government-backed conventional money or even another form of virtual currency, and vice versa. The wireless communication carrier 102 may use the virtual currency platform 114 to issue virtual currency credits to a user, such as the user, to reward the user for completing certain tasks. The tasks may include making on-time payments for telecommunication services for a predetermined period of time, participating in specific offers or incentive deals provided by the wireless communication carrier 102, agreeing to receive specific promotional communications from the wireless communication carrier 102, logging in or checking into at a specific website or webpage of the wireless communication carrier at particular dates and/or times, purchasing specific services or products from the wireless communication carrier 102, and/or so forth.

In some embodiments, the user 106 may use the presentation application 110(1) on the primary user device 108(1) to send a content request 116 for the specific program content segment 118 to the content delivery platform 104. In turn, the content delivery platform 104 may deliver the specific program content segment 118 and the associated advertising content segment 120 to the presentation application 110(1) for presentation to the user 106. However, in some instances, the presentation application 110(1) may notify the content delivery platform 104 that the user 106 has selected to consume the advertising content segment 120 on the secondary user device 108(2) at a later time. Accordingly, the content delivery platform 104 may deliver the advertising content segment 120 to the secondary user device 108(2) for storage in a data cache. The advertising content segment 120 may be delivered with metadata that stipulates parameters for the presentation of the advertising content segment 120 by the presentation application 110(2). For example, the parameters may mandate that the advertising content segment 120 must be presented using the presentation application 110(2) within a predetermined period of time to prevent the occurrence of certain events. In various embodiments, the events may include the wireless communication carrier 102 suspending certain service privileges that the user 106 has with the carrier, implementing one or more of device restrictions, function restrictions, or service restrictions with respect to the primary user device 108(1) or the secondary user device 108(2) until the advertising content segment 120 is presented, or prompting advertising content segment consumption reminders to be presented by the primary user device 108(1) or the secondary user device 108(2).

In some scenarios, the presentation application 110(1) on the primary user device may further send a skip request 122 to the content delivery platform 104. The skip request 122 may be initiated by the user 106 following a prompt from the content delivery platform 104. The prompt may be an electronic message that is presented by the presentation application 110(1) indicating that the user 106 may skip the consumption of the advertising content segment 120 for a specific amount of virtual currency credits. The skip request 122 may authorize the content delivery platform 104 to receive a payment of the specific amount of virtual currency credits from a virtual currency account of the user 106. In turn, the content delivery platform 104 may use the virtual currency platform 114 to debit the amount from the virtual currency account of the user 106. Thus, if the virtual currency credit payment to the content delivery platform 104 is successfully validated by the virtual currency platform 114, the content delivery platform 104 may instruct the presentation application 110(1) to suspend mandating the presentation of the advertising content segment 120 at the primary user device 108(1).

In alternative scenarios, the presentation application 110(2) on the secondary user device 108(2) may send a similar skip request to the content delivery platform 104 after the user 106 has selected to consume the advertising content segment 120 on the secondary user device 108(2). Thus, a virtual payment associated with the skip request is successful, the content delivery platform 104 may instruct the presentation application 110(2) to suspend mandating the presentation of the advertising content segment 120 on the secondary user device 108(2), and remove the advertising content segment 120 from the data cache of the secondary user device 108(2) to free up memory space on the secondary user device 108(2).

In some embodiments, instead of delivering an advertising content segment to the presentation application 110(1) or the presentation application 110(2) for presentation to the user 106, the content delivery platform 104 platform may deliver the advertising content segment to a third-party application 124 on the primary user device 108(1) or the secondary user device 108(2). In turn, the third-party application 124 may present the advertising content segment to the user 106 when the user 106 launches and/or interacts with the third-party application 124. The third-party application 124 may be provided by a third-party provider 126 that is unaffiliated with the wireless communication carrier 102 and the content delivery platform 104. For example, the third-party application may be a media streaming application, a gaming application, a social media application, or any other application that is capable of presenting advertisements. In such embodiments, the third-party provider 126 may have signed up with the content delivery platform 104 to present advertisement content segments from the advertising content providers in exchange for being paid a fee by the advertising content providers. Accordingly, an advertising content provider may use the virtual currency platform 114 to pay the third-party provider 126 a fee in the form of virtual currency credits to present one or more advertising content segments.

In some instances, the third-party provider 126 may have agreed to share a portion of the fee paid by the advertising content provider with the wireless communication carrier 102, the content delivery platform 104, and/or the virtual currency platform 114. Thus, one or more of these entities may receive a portion of the fee paid by the advertising content provider to the third-party provider 126 as a service charge for facilitating the transaction. Accordingly, the virtual currency platform 114 may distribute a corresponding portion of the virtual currency credits to the account of each receiving entity. Alternatively, or concurrently, the wireless communication carrier 102, the content delivery platform 104, and/or the virtual currency platform 114 may charge either or both of the third-party provider 126 and the advertising content provider fees for facilitating such transactions on an ongoing basis. The fees may include a one-time time fee, a periodically recurring fee, and/or some other fees that are paid by the third-party provider 126 and/or the advertising content provider in virtual currency credits via the virtual currency platform 114.

In other embodiments, the presentation application 110(1) may send a catalog request 128 for a digital catalog 130 to the content delivery platform 104. The catalog request 128 may be initiated by the user 106 while the user 106 is consuming a particular portion of the program content segment 118. The digital catalog 130 may contain products or services that are associated with the particular portion or the entirety of the program content segment 118, and which are available for purchase from one or more of merchants 132(1)-132(J). For example, the particular portion may be a scene in a movie, and the digital catalog 130 may contain clothing items that are worn by the protagonists in the scene. In another example, the program content segment 118 may be an episode of a television show, and the digital catalog 130 may feature services that are used by the protagonists in the television show.

Thus, the content delivery platform 104 may deliver the digital catalog 130 to the secondary user device 108(2) for presentation by the presentation application 110(2). Subsequently, the presentation application 110(2) may send a purchase request 134 to the content delivery platform 104. The purchase request 134 may be initiated by the user 106 after the user has decided to purchase one or more purchasable items from the digital catalog 130 that is offered by a merchant for a specific amount of virtual currency credits. The purchase request 134 may authorize the content delivery platform 104 to receive a payment for the specific amount of virtual currency credits from a virtual currency account of the user 106. In turn, the content delivery platform 104 may use the virtual currency platform 114 to debit the amount from the virtual currency account of the user 106. Further, the amount of the virtual currency credit is then converted by the virtual currency platform 114 into an equivalent amount of government-backed conventional money. Thus, if the virtual currency credit payment to the content delivery platform 104 is successfully validated by the virtual currency platform 114, the content delivery platform 104 may initiate a purchase transaction with the merchant to purchase the one or more items from the merchant on behalf of the user 106. In turn, the merchant may use the content delivery platform 104 to send a notification to the presentation application 110(2) to acknowledge the purchase and outline details regarding the delivery of the product or service. In some scenarios, the specific amount of virtual currency credit that is detailed in the digital catalog 130 may include service fees that are charged by the wireless communication carrier 102, the content delivery platform 104, and/or the virtual currency platform 114. Accordingly, the virtual currency platform 114 may distribute predetermined service fee amounts to the respective incoming payment virtual currency accounts of each entity.

In additional embodiments, the content delivery platform 104 may provide achievement awards to a user for consuming specific sets of program content segments or specific sets of advertising content segments in a particular time period. For example, the content delivery platform 104 may provide an achievement award to a user for consuming every program content segment of a particular show. In another example, the content delivery platform 104 may provide an achievement award to the user for consuming advertising content segments on a primary user device of the user for a particular time period, rather than deferring the consumption to a secondary user device. An achievement award that is awarded to a user may be in the form of an icon that is presented by a presentation application when the presentation application is used by the user to consume program content segments. In additional instances, a presentation application on a user device of a user may present an icon that is awarded to another user that is an online friend of the user when the user views a user profile of the other user. In further instances, the presentation application may provide access to a specific web portal of the content delivery platform 104 that presents the icons awarded to various users of the content delivery platform 104. Alternatively, or concurrently, an achievement award may take the form of virtual currency credits that are awarded to a virtual currency account of the user.

In such embodiments, the content delivery platform 104 may track the specific program content segments and advertising content segments that have been played back by the presentation applications on the primary user device 108(1) and the secondary user device 108(2) of the user 106. Accordingly, the content delivery platform may determine the specific awards that are achieved by the user 106, as well as the progress of the user 106 with respect to other achievement awards. The content delivery platform 104 may send notifications regarding the progress or awards achieved by the users for presentation on the primary and/or secondary user devices of users.

Example User Device Components

Figure 2:
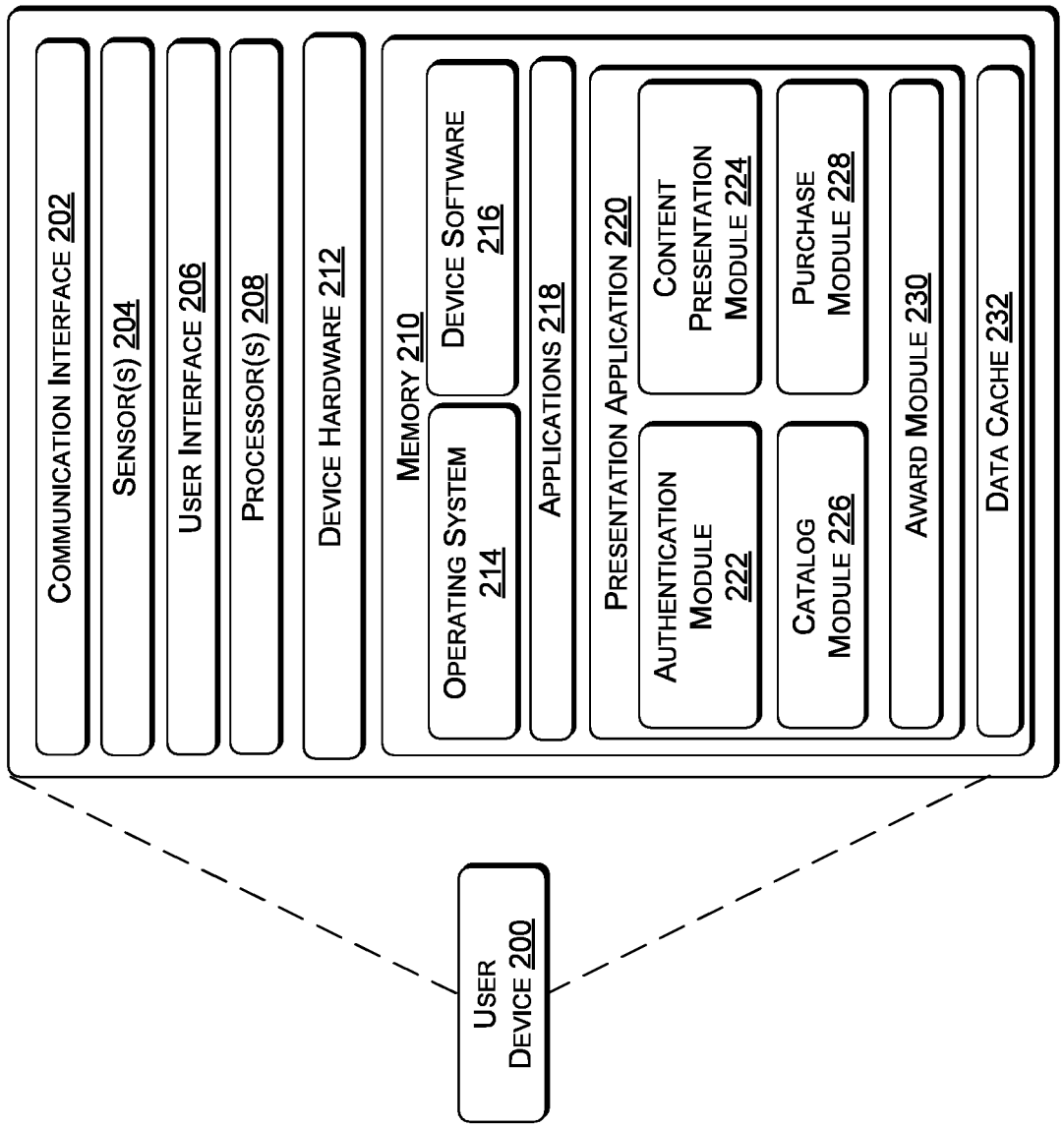
FIG. 2 is a block diagram showing various components of a user device that supports the delivery of content to multiple user devices and the use of virtual currency to manage advertising and content delivery.

FIG. 2 is a block diagram showing various components of a user device 200 that supports the delivery of content to multiple user devices and the use of virtual currency to manage advertising and content delivery. The user device may be a primary user device (e.g., primary user device 108(1)) or a secondary user device (e.g., secondary user device 108(2)). The user device 200 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect movement of objects that are proximate to the user device 200. The compass, the accelerometer, and the GPS sensor may detect orientation, movement, and geolocation of the user device 200. The cameras may capture images of the environment around the user device 200.

The user interface 206 may enable a user to provide inputs and receive outputs from the user device 200. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a modem that enables the user device 200 to perform telecommunication and data communication with a network. The device hardware 212 may further include signal converters, antennas, hardware decoders and encoders, graphics processors, a universal integrated circuit card (UICC) or an embedded UICC (eUICC), and/or the like that enable the user device 200 to execute applications and provide telecommunication and data communication functions.

The one or more processors 208 and the memory 210 of the user device 200 may implement an operating system 214, device software 216, one or more applications 218, and a presentation application 220. Such software may include routines, program instructions, objects, and/or data structures that are executed by the processors 208 to perform particular tasks or implement particular abstract data types.

The operating system 214 may include components that enable the user device 200 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the user device 200 and executes the operating system 214 following power-up of the device.

The applications 218 may include applications that provide utility, entertainment, and/or productivity functionalities to a user of the user device 200. For example, the applications 218 may include telephony applications, electronic mail applications, remote desktop applications, web browser applications, navigation applications, office productivity applications, multimedia streaming applications, an online shopping application, and/or so forth.

The presentation application 220 may include an authentication module 222, a content presentation module 224, a catalog module 226, a purchase module 228, and an award module 230. The memory 210 may be further configured to implement a data cache 232 for storing advertising content segments. In some instances, the presentation application 220 may be a built-in software function of the operating system 214. The authentication module 222 may enable a user to create or submit login credentials to establish and access a user account with the content delivery platform 104. The login credentials may include a user identifier, a user password, user biometric data, and/or so forth. In some embodiments, the wireless communication carrier 102 may share user account information with the content delivery platform 104 and/or the virtual currency platform 114. Accordingly, the user may use the login credentials previously established with the wireless communication carrier 102 to access services provided by the content delivery platform 104 and/or the virtual currency platform 114.

The content presentation module 224 may present program content segments and advertising content segments that are delivered by the content delivery platform 104. The program and advertising content segments may include still images, video files, audio files, multimedia files, etc. In various embodiments, the content presentation module 224 may include codes, decoders, filters, etc. for the presentation, e.g., playback, of different file types. The content presentation module 224 may be configured by the content delivery platform 104 to display a menu of available program content segments. The program content segments may be organized for display according to file type, genre, format, file size, file dates, and/or so forth. Accordingly, the user may use the user interface 206 to select one or more program content segments for presentation, e.g., playback, by the content presentation modules 224. The advertising content segments may be presented at specified times by the content presentation module 224 as delivered by the content delivery platform 104. For example, an advertising content segment may be presented by the content presentation module 224 prior to the presentation of a specific program content segment, during or interspersed with the presentation of the specific program content segment, and/or after the presentation of the specific program content segment.

In embodiments in which the user device 200 is a primary user device, the content presentation module 224 may provide user controls that enable the user to switch the presentation of advertising content segments to a secondary user device that is equipped with a presentation application. For example, the content presentation module 224 may be commanded by the content delivery platform 104 to present a dialogue prompt that enables the user to select whether the user desires to consume the advertising content at the secondary user device. Accordingly, if the user responds affirmatively, the content delivery platform 104 may deliver the advertising content to the secondary user device for eventual presentation. The content presentation module 224 may provide user controls that enable the user to pay to skip the consumption of the advertising content segment. For example, the content presentation module 224 may be commanded by the content delivery platform 104 to present a dialogue prompt that enables the user to initiate a payment of virtual currency credit to the content delivery platform 104 in exchange for skipping the consumption of the advertising content segment.

In some embodiments, the content presentation module 224 may include user controls that enable the user to temporarily delay the presentation of an advertising content segment. For example, the user may activate a user control to delay the presentation to the next time that the user opens the presentation application 220. However, an advertising content segment that is delivered to the user device 200 may include a presentation deadline date. The content presentation module 224 may periodically report whether each advertisement segment that is stored in a memory of the user device is presented by a corresponding presentation deadline date. Thus, if an advertising content segment is not presented by a corresponding presentation deadline date, the content delivery platform 104 may force presentation of the advertising content segment by the content presentation module 224 of the user device 200.

The catalog module 226 may present digital catalogs, such as the digital catalog 130, that are provided by the content delivery platform 104 in response to a catalog selection input from the user. A digital catalog may contain products or services that are associated with the particular portion or the entirety of a program content segment, and which are available for purchase from one or more of the merchants 132(1)-132(J). In some instances, the digital catalog may be created based on market studies or social media surveys regarding items that are popular with viewers of the program content segment, e.g., trending topics on social media, in the news, etc. For example, the particular portion may be a scene in a movie, and the digital catalog may contain clothing items that are worn by the protagonists in the scene. In another example, the program content segment may be an episode of a television show, and the digital catalog may feature services that are used by the protagonists in the television show. Accordingly, the catalog module 226 may receive purchase selections from the user, and in turn activate the purchase module 228 to complete the purchase transaction for the user.

The purchase module 228 may present a purchase interface to a user so that the user may initiate a virtual currency payment for skipping advertising content or ordering a product or service from a catalog. In some embodiments, the purchase interface may be generated by the virtual currency platform 114 under the direction of the content delivery platform 104. The purchase interface is configured to enable the user to access a virtual currency account of the user and direct virtual currency payment for a purchased item. In some instances, the purchased item may be a privilege to skip consumption of an advertising content segment. Accordingly, if the purchase is successful, the purchase module 228 may be notified by the content delivery platform 104 to direct the content presentation module 224 to terminate presentation of the advertising content segment. In other instances, the purchased item may be a product or service from a digital catalog. Accordingly, if the purchase is successful, the purchase module 228 may notify the user of information regarding the purchase success, including expected time of delivery or performance, shipping information, transaction amount, and/or so forth.

The award module 230 may track the program content segments and the advertising content segments that are consumed by a particular user on the user device 200. The award module 230 may deliver such tracking information to the content delivery platform 104. In turn, the content delivery platform 104 may aggregate the tracking information as reported by multiple user devices of the user to determine whether the user has earned an achievement award. For example, the content delivery platform 104 may provide an achievement award to a user for consuming every program content segment of a particular show. In another example, the content delivery platform 104 may provide an achievement award to the user for consuming advertising content segments on a primary user device of the user for a particular time period, rather than deferring the consumption to a secondary user device. In some instances, the content delivery platform 104 may direct the user device 200 to display progress indicators on a presentation interface of the user device 200 to show the progress of the user in achieving awards. For example, a progress indicator may include a number of program or advertising content segments that have been consumed by the user, a number of program or advertising content segments to be consumed, a listing of specific combinations of program or advertising content segments to be consumed, criteria for the consumption of program or advertising content segments to earn a particular achievement award, a percentage progress bar that displays content consumption progress, and/or so forth. In other instances, the content delivery platform 104 may direct the award module 230 to display one or more icons on the presentation interface of the user device 200, in which each icon represents an achievement award earned by the user or an online friend of the user.

Example Computing Node Components

Figure 3:
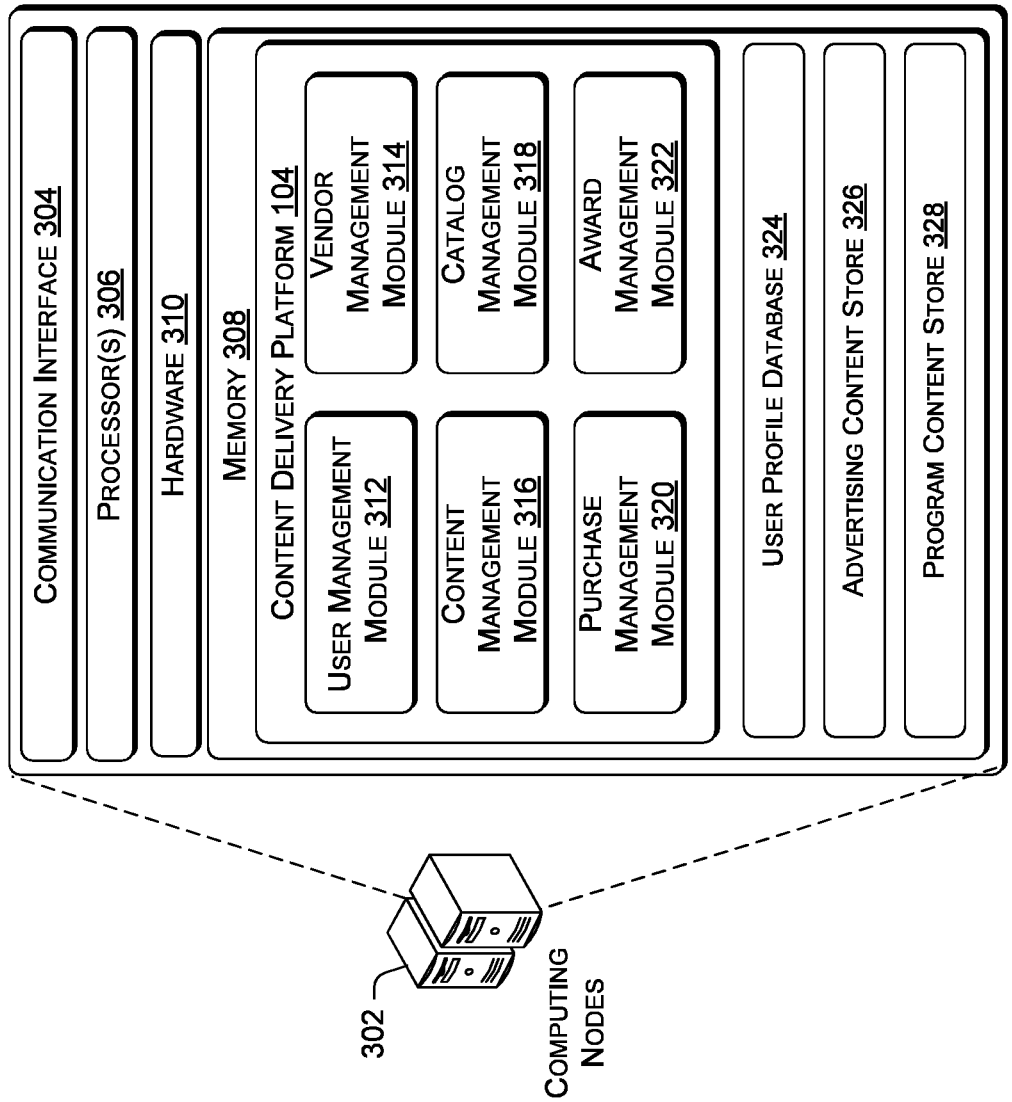
FIG. 3 is a block diagram showing various components of one or more illustrative computing nodes that enable a content delivery platform to provide content to multiple user devices.

FIG. 3 is a block diagram showing various components of one or more illustrative computing nodes that enable the content delivery platform 104 to provide content to multiple user devices. The content delivery platform 104 may be implemented by the computing nodes 302. The computing nodes 302 may include a communication interface 304, one or more processors 306, and memory 308. The communication interface 304 may include wireless and/or wired communication components that enable the one or more computing nodes 302 to transmit data to and receive data from other networked devices. The computing nodes 302 may be accessed via hardware 310. The hardware 310 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The content delivery platform 104 may be stored in the memory 308 and executed by the one or more processors 306. The content delivery platform 104 may include a user management module 312, a vendor management module 314, a content management module 316, a catalog management module 318, a purchase management module 320, and an award management module 322. The modules may include routines, program instructions, objects, and/or data structures that perform particular tasks or implement particular abstract data types.

The user management module 312 may enable users, such as the user 106, to create customer accounts. For example, a user may establish a corresponding customer account by providing registration information to the user management module 312 via a user device, such as the primary user device 108(1). The registration information may include a customer name, a customer address, customer contact information, a login identifier, a password, and/or so forth. In some instances, the login identifier may be a subscriber access identifier that is used by the wireless communication carrier 102 to authenticate the user on behalf of the content delivery platform 104. The registration information may also include the device identifiers of user devices that a user uses to consume program and/or advertising content segments. A device identifier of a user device may be a Mobile Station International Subscriber Directory Number (MSISDN), an International Mobile Equipment Identity (IMEI), an International Mobile Subscriber Identity (IMSI), a Mobile Equipment Identifier (MEID) in the form of an Electronic Serial Number (ESN). The user management module 312 may store such information of each user in a user profile database 324. Each of the customer accounts may also include account access information for one or more financial accounts that a corresponding user provided for paying purchase transactions and receiving refunds. In various embodiments, the one or more financial accounts may include virtual currency accounts that are managed by the virtual currency platform 114.

A user may earn virtual currency credits by performing specific tasks as designated by the wireless communication carrier 102. The specific tasks may include using the user devices of the user to consume advertising content segments or participate in offers of the wireless communication carrier 102 or a third-party partner of the carrier. The participation in an offer may include purchase of a product or service from the wireless communication carrier 102 or a third-party partner of the carrier, switching to using the wireless communication carrier 102 from using another wireless communication carrier, signing up for value-added services from the wireless communication carrier 102, buying prepaid telecommunication services from the wireless communication carrier 102, and/or so forth. The user may also earn virtual currency credits by paying recurring bills of the wireless communication carrier 102 on time for a predetermined duration, by referring a family member or a friend to use the telecommunication services provided by the wireless communication carrier 102, by meeting a service usage goal (e.g., keeping amount of telecommunication data used per month under a maximum data usage limit), and/or so forth. In additional instances, the wireless communication carrier 102 may award virtual currency credits to a user for being a loyal customer, e.g., at one or more anniversary dates of the user being a customer, as gifts for special occasions (e.g., a birthday), as a part of or in lieu of receiving an achievement award, and/or so forth. Thus, the wireless communication carrier 102 may direct the user management module 312 to deposit a predetermined amount of one or more virtual currency credits into a virtual currency account of a user following a completion of a particular task by the user. In other instances, the user may obtain virtual currency credits from other users either through exchange, bartering, gifting, etc. For example, such exchange, bartering, or gifting of the virtual currency credits by various users may be performed via a social media site that is operated by the wireless communication carrier 102 or a third-party service provider. In further embodiments, a user may also use the virtual currency platform 114 to directly exchange government-backed currency for virtual currency for deposit in the corresponding virtual currency account. In such, the user may designate one or more conventional financial accounts, such as a bank debit account, a credit card account, etc. as being associated with the virtual currency account for such a purpose. The wireless communication carrier 102 may deposit the virtual currency credits that are acquired by a user into a corresponding virtual currency account of the user.

In various embodiments, a user may designate a particular virtual currency account of the user as being associated for use with a user device for making payments to skip advertising content segments and making other purchases on the user device. In some instances, the particular virtual currency account may be an individual virtual currency account of the user that is solely accessible to the user. In other instances, the particular virtual currency account may be a common wallet account that is accessible to multiple users for the purpose of making purchases. For example, the common wallet account (e.g., family account) may be set up by a primary account holder. The primary account holder may then designate certain additional users (e.g., family members) as authorized users. In such an example, an additional user may have the ability to setup the common wallet account for use with a user device of the additional user. The user management module 312 may store such virtual account association information of each user in the user profile database 324.

The vendor management module 314 may be responsible for managing vendor access to the content delivery platform 104. The vendors may include advertisers, also referred to as advertising content providers, who desire to purchase advertising space in order to present advertising content segments, third-party providers who desire to offer advertising spaces on their third-party applications as installed on user devices, and merchants who desire to feature their products in the digital catalogs. Accordingly, the vendor management module 314 may enable vendors to create vendor accounts. A vendor may establish a corresponding vendor account by providing registration information to the vendor management module 314 via a user device. The registration information may include a vendor name, a business name, a business address, business contact information, a login name, a password, and/or so forth. In instances in which a vendor is an advertiser, a vendor account may enable the advertiser to purchase advertising space to present advertising content segments along with specific program content segments via an auction. The vendor management module 314 may broadcast advertising bid requests for advertising content segments to be presented with specific program content segments. In some instances, the advertising bid requests may be broadcasted on behalf of the third-party providers that have signed up with the content delivery platform 104 to offer advertising spaces on their third-party applications that are installed on user devices, such as the primary user device 108(1) and the secondary user device 108(2). Each of the advertising bid requests may include the type of advertising content segment solicited, details regarding duration and/or presentation frequency of the advertising content segment, a starting bid price, payment terms, and/or so forth. In return, multiple advertisers may provide bids for their advertising content segments. A bid placed by an advertiser may include a fee for presenting a corresponding advertising content segment, a subject matter description of the advertising content segment content, and/or so forth. Accordingly, the vendor management module 314 may use an algorithm to select an advertiser of the multiple advertisers as the winning bid. For example, the algorithm may select an advertising content segment of the advertiser to be presented with a specific program content segment solely based on the fee offered. In another example, the algorithm may select an advertiser based on multiple factors, such as the fee offered, the subject matter of the advertising content segment, the reputation of the advertiser, and/or so forth. The vendor management module 314 may store the selected advertising content segments in an advertising content store 326.

In instances in which a vendor is a merchant, a vendor account may enable the merchant to offer auction bids for supplying products that are featured in digital catalogs for purchase by consumers. In various embodiments, the vendor management module 314 may broadcast a bid request for merchants to supply a product or a service that is featured in a program content segment. Each of the bid requests may include the specifications for the product or the service that is featured, quantity of the product or the service desired, delivery terms for the product or the service, etc. In return, several of the merchants may provide bids for selling the product or the service through the content delivery platform 104. A bid placed by a merchant may include a price for each product or service, payment terms, cost of shipping or delivery, and/or so forth. In some embodiments, a bid that is submitted by a merchant may further include information regarding the merchant, such as the name of the merchant, reviews and ratings of the merchant, location of the merchant, contact information for the merchant, etc. Accordingly, the vendor management module 314 may use an algorithm to select a merchant of the multiple merchants that submitted bids as a supplier of the product or the service in a digital catalog. For example, the algorithm may select a merchant as the supplier solely based on price. In another example, the algorithm may select a merchant based on the price, the reputation of the merchant, the timeliness of performance, the location of the merchant, and/or so forth.

The content management module 316 may deliver program content segments and advertising content segments to the user devices of users. The content management module 316 may deliver program content segments to user devices in response to requests that are initiated by the user devices. In some embodiments, the program content segments may be delivered to user devices from a program content store 328 that stores program content segments aggregated from multiple program content providers. In other embodiments, the content management module 316 may initiate streaming of program content segments directly from program content providers to the user devices. The content management module 316 may retrieve advertising content segments from an advertising content store 326 and deliver the advertising content segment at one or more specified times to a user device, such that the advertising content segments are shown at the one or more times by a user device with respect to a program content segment. For example, the advertising content segment may be presented prior to the presentation of a specific program content segment, during or interspersed with the presentation of the specific program content segment, and/or after the presentation of the specific program content segment.

In some embodiments, the content management module 316 may receive a request from a user device to present an advertising content segment at a secondary user device instead of a primary user device. In such embodiments, the content management module 316 may deliver the advertising content segment to a memory of the secondary user device for subsequent presentation. The advertising content segment that delivered to a secondary user device may include metadata that specifies a presentation deadline date for the advertising content segment. Thus, the content management module 316 may force presentation of the advertising content segment by the secondary user device through device, function, or service restriction if voluntary consumption of the advertising content segment does not occur by the presentation deadline date.

In some instances, the forced presentation may occur when an application provided by the wireless communication carrier 102 is opened by a user on the user device, when the user opens a presentation application or a virtual currency management webpage to view or modify a virtual currency account balance, when the user opens an application that is provided by a third-party partner of the wireless communication carrier 102, following the user making a voice call using a telephony application on the user device and before the voice call connects, etc. In other instances, the forced presentation of the advertising content segment by a user device may automatically occur when a home screen of the user device is unlocked by the user. The forced presentation may also occur following a user initiating a Wi-Fi connection to a Wi-Fi access point on the user device and before the Wi-Fi connection is made, before a snooze function of an alarm application is allowed to work, before allowing download of applications from an application store, following an input of a search query into a search application and prior to the search application providing the search results, before the user is allowed to access non-critical features of a vehicle infotainment console or allowed to access features of the console at non-critical times, and/or so forth. Non-critical features are features that do not affect the control and drivability of the vehicle, and non-critical times may be times when the vehicle is not in motion. The forced presentation of the advertising content segment may be coordinated by the presentation application on the user device in conjunction with one or more third-party applications and/or the operating system of the user device. The presentation application on the user device may notify the content management module 316 following the performance of a forced presentation.

The catalog management module 318 may send digital catalogs to the user devices in response to catalog requests from the user devices. In various embodiments, the digital catalogs may be configured by the catalog management module 318 to contain items that are offered for sale by the merchants, such as the merchants 132(1)-132(J). Each item that is offered for sale may be accompanied by a description of the item, a price for the item, delivery terms, applicable sales tax to be charged, user reviews or ratings for the item, and/or so forth. Accordingly, a user may request a digital catalog as a program content segment is being presented on a primary user device. Subsequently, the user may view the digital catalog on a secondary user device, select an item of interest, and use a purchase link associated with the item of interest to send a purchase request for the item to the content delivery platform 104.

The purchase management module 320 may be triggered by a purchase request that originates from a user device. The purchase request may be initiated by a user to purchase a privilege of skipping the consumption of an advertising content segment or to purchase an item from a digital catalog. Accordingly, the purchase request may indicate a nature of the purchase, an amount of the purchase in virtual currency credits, a description of the item being purchased, a vendor that is to supply the item, and/or so forth. The purchase request may further include a user identifier of a user or a device identifier of the user device that initiated the request. Accordingly, the purchase management module 320 may determine from the information in the user profile database 324 the virtual currency account that is associated with the user identifier or the device identifier, and then generate a virtual currency purchase transaction for processing by the virtual currency platform 114. In turn, the virtual currency purchase transaction may verify that the virtual currency account is valid and has sufficient virtual currency credit to pay for the purchase. Thus, if there is sufficient virtual currency credit, the virtual currency platform 114 may debit the appropriate virtual currency credit from the account and then notify the purchase management module 320 that the purchase transaction is complete. In an instance in which the purchase transaction is completed for skipping an advertising content segment, the purchase management module 320 may notify a corresponding user device to skip presentation of the segment. In an alternative instance in which the purchase transaction is completed for purchasing an item, the purchase management module 320 may receive purchase confirmation information from the merchant. In turn, the purchase management module 320 may forward the information to the corresponding user device. In the alternative instance, the merchant may be expecting government-backed currency instead of virtual currency. Thus, the virtual currency platform 114 may perform an asset exchange function to convert the virtual currency credits that are debited from the virtual currency account into a corresponding amount of government-backed currency for transfer to an account of the merchant.

The award management module 322 may store the consumption information regarding the program content segments and advertising content segments that are consumed by each user on various user devices. In turn, the award management module 322 may store such consumption information for each user in the user profile database 324. The consumption information of each user may be continuously or periodically analyzed to determine whether the user has earned a new achievement award or made progress towards a new achievement award. In various embodiments, the analysis may be performed by comparing the consumption information of a user to preconfigured criteria for earning each new achievement award. The criteria for earning an achievement award may specify a list of program content segments and/or advertising content segments that have to be consumed by the user. The criteria may further specify the conditions under which the segments are to be consumed, such as consumption time limits, designated consumption devices, orders of segment consumption, designated consumption dates and/or times, etc. In this way, the award management module 322 may store an achievement award that is earned by the user in the user profile database 324 and may also send an indication of the new achievement award to a user device of a corresponding user. In instances in which the earning of the achievement award is accompanied or substituted by the award of virtual currency credits, the award management module 322 may also trigger the user management module 312 to credit a virtual currency account of the user an appropriate amount of virtual currency credit. Alternatively, the award management module 322 may also send data on the progress of each user towards one or more achievement awards to corresponding user devices of each user.

Example Processes

FIGS. 4-8 present illustrative processes 400-800 for delivering program and advertising content to multiple user devices. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
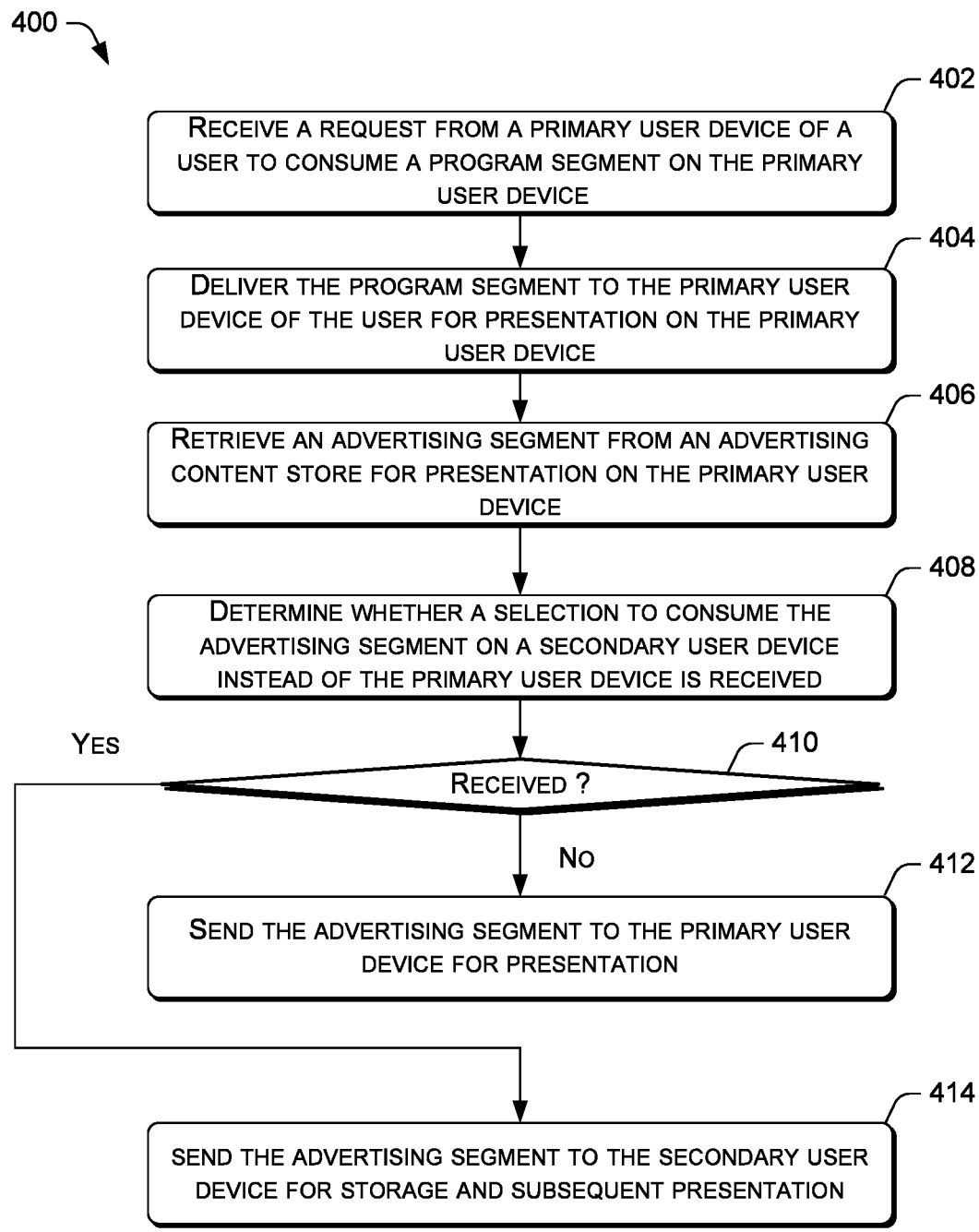
FIG. 4 is a flow diagram of an example process for selectively delivering advertising content segments to a primary user device or a secondary user device based on a selection received at the primary user device.

FIG. 4 is a flow diagram of an example process 400 for selectively delivering advertising content segments to a primary user device or a secondary user device based on a selection received at the primary user device. At block 402, the content delivery platform 104 may receive a request from a primary user device of a user to consume a program content segment on the primary user device. The request may be initiated by a user on the primary user device via an interface control. The program content segment may include audio content, video content, or multimedia content. For example, the program content segment may be a show, an episode, a media work, a broadcast event, etc. At block 404, the content delivery platform 104 may deliver the program content segment to the primary user device for presentation on the primary user device. In various embodiments, the delivery may include streaming the program content segment or otherwise sending a data file that encapsulates the program content segment to the primary user device.

At block 406, the content delivery platform 104 may retrieve an advertising content segment from an advertising content store for presentation on the primary user device. The advertising content segment may be provided by an advertiser to promote a product or service, in which the fees paid by the advertiser for the advertising content segment to be presented may offset a cost of providing the program content segment for presentation. At block 408, the content delivery platform 104 may determine whether a selection to consume the advertising content segment on a secondary user device instead of the primary user device is received from the primary user device. In various embodiments, a user interface of the primary user device may display a query prompt that is initiated by the content delivery platform 104, in which the query prompt may ask whether the user desires to defer the consumption of the advertising content segment to the secondary user device. Accordingly, the selection may be initiated by a user on the primary user device to defer the viewing of the advertising content segment.

At decision block 410, if the content delivery platform 104 determines that no selection is received ("no" at decision block 410), the process 400 may proceed to block 412. At block 412, the content delivery platform 104 may send the advertising content segment to the primary user device for presentation by the primary user device. However, if the content delivery platform 104 determines that a selection is received ("yes" at decision block 410), the process 400 may proceed to block 414. At block 414, the content delivery platform 104 may send the advertising content segment to the secondary user device, where the segment is stored in a data cache for subsequent presentation.

Figure 5:
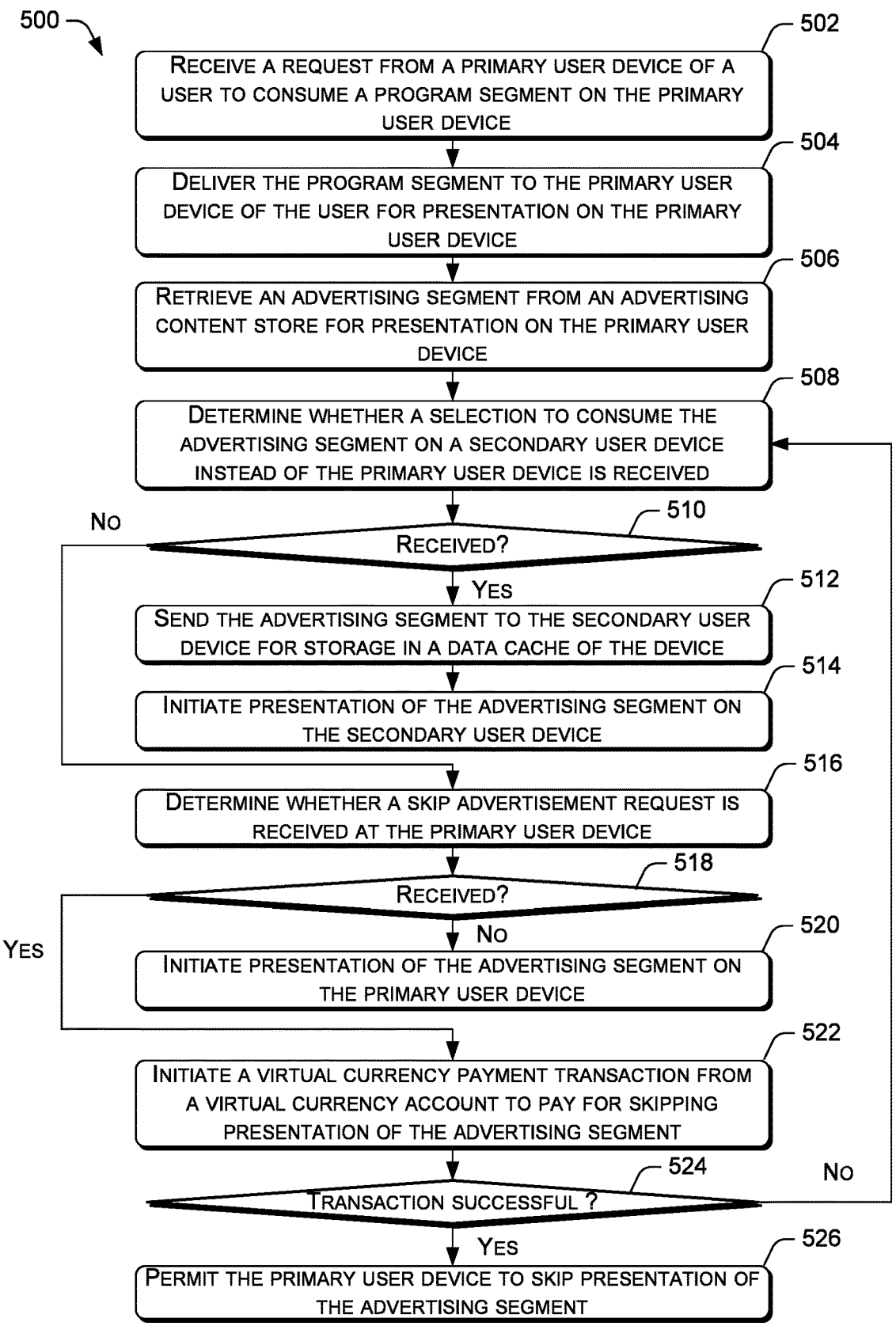
FIG. 5 is a flow diagram of an example process for the delivery of an advertising content segment to a primary user device and the use of virtual currency to skip the consumption of the advertising content segment at the primary user device.

FIG. 5 is a flow diagram of an example process 500 for the delivery of an advertising content segment to a primary user device and the use of virtual currency to skip the consumption of the advertising content segment at the primary user device. At block 502, the content delivery platform 104 may receive a request from a primary user device of a user to consume a program content segment on the primary user device. The request may be initiated by a user on the primary user device via an interface control. The program content segment may include audio content, video content, or multimedia content. For example, the program content segment may be a show, an episode, a media work, a broadcast event, etc. At block 504, the content delivery platform 104 may deliver the program content segment to the primary user device for presentation on the primary user device. In various embodiments, the delivery may include streaming the program content segment or otherwise sending a data file that encapsulates the program content segment to the primary user device.

At block 506, the content delivery platform 104 may retrieve an advertising content segment from an advertising content store for presentation on the primary user device. The advertising content segment may be provided by an advertiser to promote a product or service, in which the fees paid by the advertiser for the advertising content segment to be presented may offset a cost of providing the program content segment for presentation. At block 508, the content delivery platform 104 may determine whether a selection to consume the advertising content segment on a secondary user device instead of the primary user device is received from the primary user device. In various embodiments, a user interface of the primary user device may display a query prompt that is initiated by the content delivery platform 104, in which the query prompt may ask whether the user desires to defer the consumption of the advertising content segment to the secondary user device. Accordingly, the selection may be initiated by a user on the primary user device to defer the viewing of the advertising content segment.

At decision block 510, if the content delivery platform 104 determines that a selection to consume the advertising segment on the secondary user device is received ("yes" at decision block 510), the process 500 may proceed to block 512. At block 512, the content delivery platform 104 may send the advertising content segment to the secondary user device for storage in a data cache of the secondary user device. At block 514, the content delivery platform 104 may initiate presentation of the advertising content segment on the secondary user device. In some embodiments, the content delivery platform 104 may be configured to enable the user to further delay the consumption of the advertising content segment at the secondary user device for another period of time. However, any delay of consumption past a presentation deadline date of the advertising content segment may result in a forced presentation of the advertising content segment by the secondary user device.

Returning to decision block 510, if the content delivery platform 104 determines that a selection to consume the advertising content on a secondary user device is not received ("no" at decision block 410), the process 500 may proceed to block 516. At block 516, the content delivery platform 104 may determine whether a skip advertisement request is received at the primary user device. The user may initiate the skip advertisement request at the primary user device to avoid consuming the advertising content segment on the device. At decision block 518, if the content delivery platform 104 determines that no skip advertisement request is received ("no" at decision block 518), the process 500 may proceed to block 520. At block 520, the content delivery platform 104 may initiate presentation of the advertising content segment on the primary user device.

Returning to decision block 518, if the content delivery platform 104 determines that a skip advertisement request is received ("yes" at decision block 518), the process 500 may proceed to block 522. At block 522, the content delivery platform 104 may initiate a virtual currency payment transaction from a virtual currency account to pay for skipping presentation of the advertising content segment. In various embodiments, the virtual currency account may be an individual account or a common wallet account that is designated by a user as being authorized for paying transactions associated with the primary user device. The virtual currency payment may be processed by a virtual currency platform 114, in which the platform may notify whether the virtual currency transaction is successfully processed.

At decision block 524, if the content delivery platform 104 determines that the transaction is successful ("yes" at decision block 524), the process 500 may proceed to block 526. At block 526, the content delivery platform 104 may permit the primary user device to skip presentation of the advertising content segment. However, if the content delivery platform 104 determines that the transaction is not successful ("no" at decision block 524), the process 500 may loop back to block 508. In some embodiments, the loop back to block 508 may be performed for a predetermined number of additional unsuccessful transaction attempts before the content delivery platform 104 initiates presentation of the advertising content segment on the primary user device.

Figure 6:
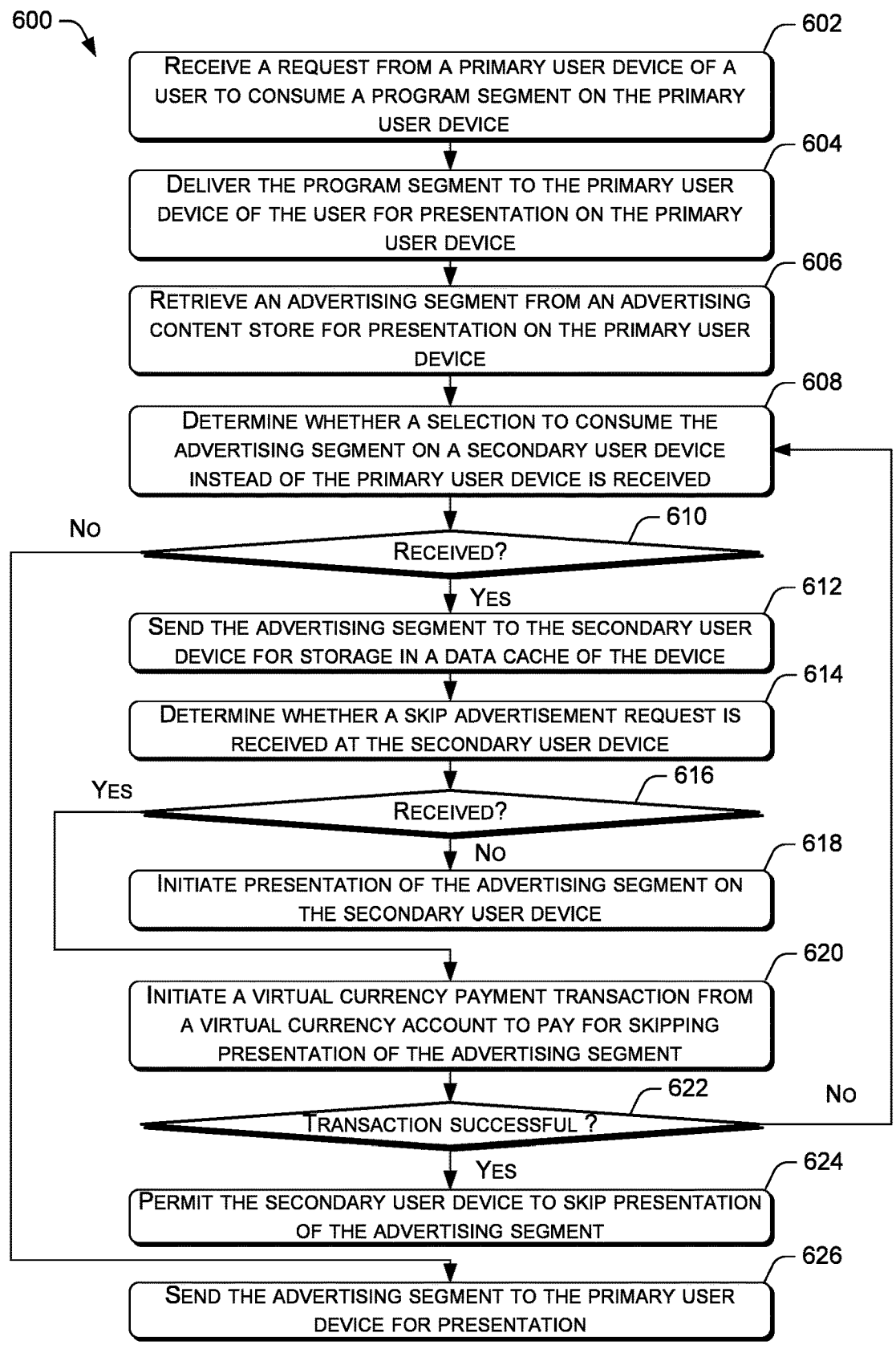
FIG. 6 is a flow diagram of an example process for the delivery of an advertising content segment to a secondary user device and the use of virtual currency to skip the consumption of the advertising content segment at the secondary user device.

FIG. 6 is a flow diagram of an example process 600 for the delivery of an advertising content segment to a secondary user device and the use of virtual currency to skip the consumption of the advertising content segment at the secondary user device. At block 602, the content delivery platform 104 may receive a request from a primary user device of a user to consume a program content segment on the primary user device. The request may be initiated by a user on the primary user device via an interface control. The program content segment may include audio content, video content, or multimedia content. For example, the program content segment may be a show, an episode, a media work, a broadcast event, etc. At block 604, the content delivery platform 104 may deliver the program content segment to the primary user device for presentation on the primary user device. In various embodiments, the delivery may include streaming the program content segment or otherwise sending a data file that encapsulates the program content segment to the primary user device.

At block 606, the content delivery platform 104 may retrieve an advertising content segment from an advertising content store for presentation on the primary user device. The advertising content segment may be provided by an advertiser to promote a product or service, in which the fees paid by the advertiser for the advertising content segment to be presented may offset a cost of providing the program content segment for presentation. At block 608, the content delivery platform 104 may determine whether a selection to consume the advertising content segment on a secondary user device instead of the primary user device is received from the primary user device. In various embodiments, a user interface of the primary user device may display a query prompt that is initiated by the content delivery platform 104, in which the query prompt may ask whether the user desires to defer the consumption of the advertising content segment to the secondary user device. Accordingly, the selection may be initiated by a user on the primary user device to defer the viewing of the advertising content segment.

At decision block 610, if the content delivery platform 104 determines that a selection to consume the advertising segment on the secondary user device is received ("yes" at decision block 610), the process 600 may proceed to block 612. At block 612, the content delivery platform 104 may send the advertising content segment to the secondary user device for storage in a data cache of the secondary user device. At block 614, the content delivery platform 104 may determine whether a skip advertisement request is received at the secondary user device. The user may initiate the skip advertisement request at the secondary user device to avoid consuming the advertising content segment on the device. At decision block 616, if the content delivery platform 104 determines that no skip advertisement request is received ("no" at decision block 616), the process 600 may proceed to block 618. At block 618, the content delivery platform 104 may initiate presentation of the advertising content segment on the secondary user device. In some embodiments, the content delivery platform 104 may be configured to enable the user to further delay the consumption of the advertising content segment at the secondary user device for another period of time. However, any delay of consumption past a presentation deadline date of the advertising content segment may result in a forced presentation of the advertising content segment by the secondary user device.

However, if the content delivery platform 104 determines that a skip advertisement request is received ("yes" at decision block 616), the process 600 may proceed to block 620. At block 620, the content delivery platform 104 may initiate a virtual currency payment transaction from a virtual currency account to pay for skipping presentation of the advertising content segment. In various embodiments, the virtual currency account may be an individual account or a common wallet account that is designated by a user as being authorized for paying transactions associated with the secondary user device. The virtual currency payment may be processed by a virtual currency platform 114, in which the platform may notify whether the virtual currency transaction is successfully processed.

At decision block 622, if the content delivery platform 104 determines that the transaction is successful ("yes" at decision block 622), the process 600 may proceed to block 624. At block 624, the content delivery platform 104 may permit the secondary user device to skip presentation of the advertising content segment. However, if the content delivery platform 104 determines that the transaction is not successful ("no" at decision block 622), the process 600 may loop back to block 608. In some embodiments, the loop back to block 608 may be performed for a predetermined number of additional unsuccessful transaction attempts before the content delivery platform 104 initiates presentation of the advertising content segment on the secondary user device.

Returning to decision block 610, if the content delivery platform 104 determines that a selection to consume the advertising content on a secondary user device is not received ("no" at decision block 610), the process 600 may proceed to block 626. At block 626, the content delivery platform 104 may send the advertising content segment to the primary user device for presentation by the primary user device.

While FIGS. 4-6 describe the delivery of a single advertisement content segment with a program content segment for presentation, multiple advertising content segments may be delivered with the program content segment in other embodiments. In such embodiments, the same operation may be performed for each of the multiple advertising content segments as outlined for a single advertising content segment in FIGS. 4-6.

Figure 7:
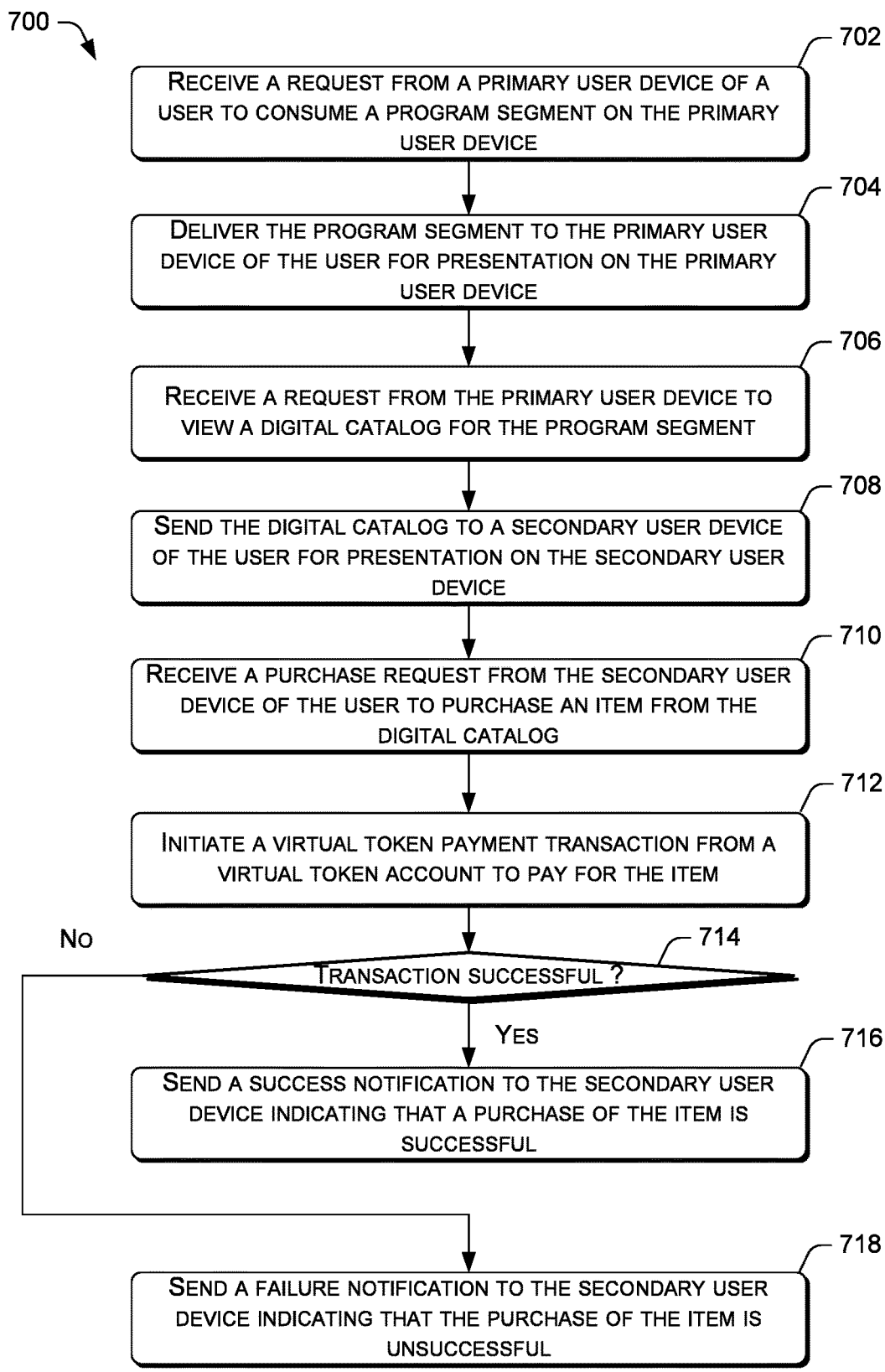
FIG. 7 is a flow diagram of an example process for the purchase of an item that is associated with a program content segment via a secondary view device.

FIG. 7 is a flow diagram of an example process 700 for the purchase of an item that is associated with a program content segment via a secondary view device. At block 702, the content delivery platform 104 may receive a request from a primary user device of a user to consume a program content segment on the primary user device. The request may be initiated by a user on the primary user device via an interface control. The program content segment may include audio content, video content, or multimedia content. For example, the program content segment may be a show, an episode, a media work, a broadcast event, etc. At block 704, the content delivery platform 104 may deliver the program content segment to the primary user device for presentation on the primary user device. In various embodiments, the delivery may include streaming the program content segment or otherwise sending a data file that encapsulates the program content segment to the primary user device.

At block 706, the content delivery platform 104 may receive a request from the primary user device to view a digital catalog for the program content segment. In various embodiments, the digital catalog may contain products or services that are associated with a particular portion or the entirety of the program content segment, and which are available for purchase from one or more of the merchants. For example, the particular portion may be a scene in a movie, and the digital catalog may contain clothing items that are worn by the protagonists in the scene. In another example, the program content segment may be an episode of a television show, and the digital catalog may feature services that are used by the protagonists in the television show.

At block 708, the content delivery platform 104 may send the digital catalog to a secondary user device of the user for presentation on the secondary user device. In various embodiments, each item that is offered for sale in the digital catalog may be accompanied by a description of the item, a price for the item, delivery terms, applicable sales tax to be charged, user reviews or ratings for the item, and/or so forth.

Accordingly, the user may view a digital catalog, select an item of interest, and use a purchase link associated with the item of interest to send a purchase request for the item to the content delivery platform 104. At block 710, the content delivery platform 104 may receive a purchase request from the secondary user device of the user to purchase an item from the digital catalog.

At block 712, the content delivery platform 104 may initiate a virtual currency payment transaction from a virtual currency account to pay for the item. In various embodiments, the virtual currency account may be an individual account or a common wallet account that is designated by a user as being authorized for paying transactions associated with the secondary user device. The virtual currency payment may be processed by a virtual currency platform 114, in which the platform may notify whether the virtual currency transaction is successfully processed.

At decision block 714, if the content delivery platform 104 determines that the transaction is successful ("yes" at decision block 714), the process 700 may proceed to block 716. At block 716, the content delivery platform 104 may send a success notification to the secondary user device indicating that a purchase of the item is successful. In some embodiments, the success notification may include information such as expected time of delivery or performance, shipping information, transaction amount, and/or so forth. However, if the content delivery platform 104 determines that the transaction is not successful ("no" at decision block 714), the process 700 may proceed to block 718. At block 718, the content delivery platform 104 may send a failure notification to the secondary user device indicating that a purchase of the item is not successful. In some embodiments, the failure notification may indicate a reason for the transaction failure, such as insufficient funds, suspended account, etc. In some alternative embodiments, the digital catalog may be sent to the primary user device instead of the secondary user device at block 708. Accordingly, blocks 710-712 may be performed with respect to the primary user device instead of the secondary user device.

Figure 8:
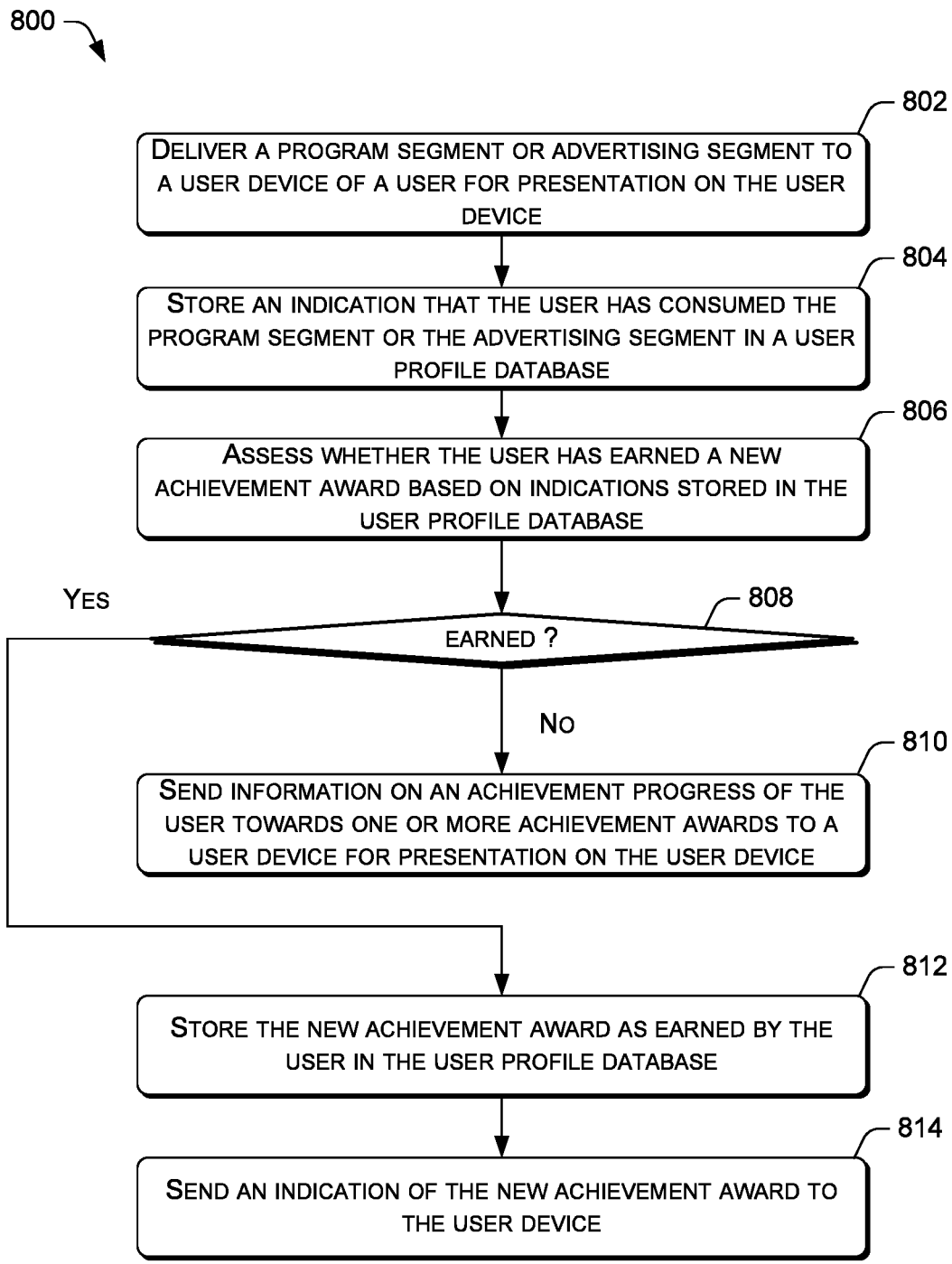
FIG. 8 is a flow diagram of an example process for providing achievement awards with respect to the consumption of program content segments or advertising content segments.

FIG. 8 is a flow diagram of an example process 800 for providing achievement awards with respect to the consumption of program content segments or advertising content segments. At block 802, the content delivery platform 104 may deliver a program content segment or an advertising content segment to a user device of a user for presentation on the user device. The program content segment may include audio content, video content, or multimedia content. For example, the program content segment may be a show, an episode, a media work, a broadcast event, etc. The advertising content segment may be provided by an advertiser to promote a product or service, in which the fees paid by the advertiser for the advertising content segment to be presented may offset a cost of providing the program content segment for presentation. The user device may be a primary user device or a secondary user device of the user.

At block 804, the content delivery platform 104 may store an indication that the user has consumed the program content segment or the advertising content segment in a user profile database. The content delivery platform 104 may store such an indication following a notification from a user device that a presentation of a program content segment or an advertising content segment is completed by the user device. At block 806, the content delivery platform 104 may assess whether the user has earned a new achievement award based on indications stored in the user profile database. In various embodiments, the assessment may be performed by comparing the indications of a user to preconfigured criteria for earning each new achievement award. The criteria for earning an achievement award may specify a list of program content segments and/or advertising content segments that have to be consumed by the user. The criteria may further specify the conditions under which the segments are to be consumed. At decision block 808, if the content delivery platform 104 determines that the user has not earned a new achievement award ("no" at decision block 808), the process 800 may proceed to block 810. At block 810, the content delivery platform 104 may send information on an achievement progress of the user towards one or more achievement awards to a user device for presentation on the user device. The information on the achievement progress may include a number of program or advertising content segments that have been consumed by the user, a number of program or advertising content segments to be consumed, a listing of specific combinations program or advertising content segments to be consumed, criteria for the consumption of program or advertising content segments to earn a particular achievement award, a percentage progress bar that displays content consumption progress, and/or so forth.

However, if the content delivery platform 104 determines that the user has earned a new achievement award ("yes" at decision block 808), the process 800 may proceed to block 812. At block 812, the content delivery platform 104 may store the new achievement award as earned by the user in the user profile database. At block 814, the content delivery platform 104 may end an indication of the new achievement award to the user device. The indication of the new achievement award may include a name of the achievement award, an icon that represents the achievement award, and/or other information that are relevant to the achievement award. In some instances, the indication may further include a notification of an amount of virtual currency credits or other awards that are earned by the user.

The techniques may enable a wireless communication carrier to provide media streaming services to telecommunication service users by aggregating program content segments from multiple content providers for delivery to the users. By providing users with the ability to defer the consumption of advertising content segments to a later time or using awarded virtual currency to skip the consumption of advertising content segments, the wireless communication carrier may increase user satisfaction and provide additional incentives for the users to utilize the telecommunication services offered by the wireless communication carrier.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution by one or more processors configured to perform a plurality of acts, cause the one or more processors to perform acts comprising:

delivering a program content segment to a primary user device of a user;

retrieving an advertising content segment from an advertising content store, the advertising content segment associated with an advertiser that is sponsoring presentation of the program content segment on the primary user device;

receiving a user selection from the primary user device to consume the advertising content segment on a secondary user device instead of on the primary user device;

sending the advertising content segment to the secondary user device in response to the user selection;

receiving a skip advertisement request to skip presentation of the advertising content segment on the secondary user device;

initiating a virtual currency payment via a virtual currency platform to pay for skipping presentation of the advertising content segment on the secondary user device, in response to the receiving of the skip advertisement request;

initiating presentation of the primary content segment on the secondary user device with the advertising content segment skipped, in response to a success of the virtual currency payment; and conducting transactions with the user via the virtual currency platform including purchasing products and services using a first virtual currency, converting the first virtual currency into at least one other virtual currency or non-virtual currency asset, converting the at least one other virtual currency or non-virtual currency asset into the first virtual currency, and depositing one or more virtual currency credits to a virtual currency account of the user.

2. The one or more non-transitory computer-readable media of claim 1, wherein the delivering includes delivering the program content segment to the primary user device in response to a request from the primary user device for the program content segment.

3. The one or more non-transitory computer-readable media of claim 1, wherein the acts further comprise depositing the one or more virtual currency credits into the virtual currency account in response to the user completing a task specified by a wireless communication carrier.

4. The one or more non-transitory computer-readable media of claim 3, wherein at least one of the first virtual currency, the other virtual currency and the virtual currency credits are cryptocurrency secured by blockchain technology.

5. The one or more non-transitory computer-readable media of claim 3, wherein the virtual currency account is an individual account accessible solely to the user or a common wallet account accessible to multiple users.

6. The one or more non-transitory computer-readable media of claim 1, wherein the acts further comprise:

sending a digital catalog of one or more purchasable items to the secondary user device as the program content segment is presented on the primary user device, the one or more purchasable items being featured in the program content segment.

7. The one or more non-transitory computer-readable media of claim 6, wherein the acts further comprise:

receiving a request to purchase a purchasable item from the secondary user device;

initiating a virtual currency payment transaction from a virtual currency account associated with the secondary user device to pay for the purchasable item following the request; and sending a notification of a purchase of the purchasable item to the secondary user device following a success of the virtual currency payment transaction.

8. The one or more non-transitory computer-readable media of claim 6, wherein a purchasable item is supplied by a merchant selected through an auction from a plurality of merchants that desires to supply the purchasable item.

9. The one or more non-transitory computer-readable media of claim 1, wherein the sending includes sending the advertising content segment for storage in a memory cache of the secondary user device for presentation at a later time by the secondary user device.

10. The one or more non-transitory computer-readable media of claim 9, wherein the advertising content segment is provided with a presentation deadline date to implement a device restriction with respect to the primary user device or the secondary user device.

11. The one or more non-transitory computer-readable media of claim 1, wherein the advertiser is a winning advertiser of a plurality of advertisers that submitted auction bids to have corresponding advertising content segments featured with the program content segment.

12. The one or more non-transitory computer-readable media of claim 1, wherein the sending the advertising content segment includes sending the advertising content segment to a presentation application provided by a wireless communication carrier, or to a third-party application of a third-party provider that is paid via a virtual currency payment by the advertiser to present the advertising content segment using the third-party application.

13. The one or more non-transitory computer-readable media of claim 1, wherein the acts further comprise:

delivering, via a content delivery platform executing one or more computing nodes, the program content segment or the advertising content segment to the secondary user device;

storing an indication in a database that the program content segment or the advertising content segment has been consumed following a presentation of the program content segment or the advertising content segment by the secondary user device;

determining, at the content delivery platform, based on an assessment of a plurality of indications in the database that the user has earned a new achievement award through consumption of at least one program content segment or at least one advertising content segment; and sending, via the content delivery platform, an indication of the new achievement award to the secondary user device.

14. The one or more non-transitory computer-readable media of claim 13, further comprising storing the new achievement award in the database.

15. The one or more non-transitory computer-readable media claim 13, wherein the acts further comprise awarding one or more virtual currency credits into a virtual currency account of the user for achieving the new achievement award.

16. The one or more non-transitory computer-readable media claim 13, further comprising sending information on an achievement progress of the user towards an additional new achievement award to the secondary user device.

17. The one or more non-transitory computer-readable media of claim 16, wherein the sending includes sending the information on the achievement progress following a determination based on an additional assessment of the indications in the database that the user has not yet earned the additional new achievement award through the consumption of the at least one program content segment or the at least one advertising content segment.

18. A system, comprising:
one or more processors configured to perform a plurality of actions; and
memory including a plurality of computer-executable components that are executable by the one or more processors to perform actions comprising:
delivering a program content segment to a primary user device of a user;
retrieving an advertising content segment from an advertising content store, the advertising content segment associated with an advertiser that is sponsoring presentation of the program content segment on the primary user device;
receiving a user selection from the primary user device to consume the advertising content segment on a secondary user device instead of on the primary user device;
sending the advertising content segment to the secondary user device in response to the user selection;
receiving a skip advertisement request to skip presentation of the advertising content segment on the secondary user device;
initiating a virtual currency payment via a virtual currency platform to pay for skipping presentation of the advertising content segment on the secondary user device, in response to the receiving of the skip advertisement request;
initiating presentation of the primary content segment on the secondary user device with the advertising content segment skipped, in response to a success of the virtual currency payment;
conducting transactions with the user via the virtual currency platform including purchasing products and services using a first virtual currency, converting the first virtual currency into at least one other virtual currency or non-virtual currency asset, converting the at least one other virtual currency or non-virtual currency asset into the first virtual currency, and depositing one or more virtual currency credits to a virtual currency account of the user;
receiving a request to consume the advertising content segment at the secondary user device at a later time;
determining whether the advertising content segment is consumed at the secondary user device within a predetermined period of time; and
in response to determining that the advertising content segment is not consumed at the secondary user device within the predetermined period of time, suspending one or more service privileges associated with the user.

19. The system of claim 18, wherein the advertising content segment is provided with a presentation deadline date to implement a function restriction with respect to the primary user device or the secondary user device.

20. The system of claim 18, wherein the advertising content segment is provided with a presentation deadline date to implement a service restriction with respect to the primary user device or the secondary user device.

* * * * *